(12) United States Patent
Yang et al.

(10) Patent No.: US 10,104,716 B2
(45) Date of Patent: *Oct. 16, 2018

(54) APPARATUS AND METHOD FOR RELAYING BY MOBILE DEVICE, AND STORAGE MEDIUM

(71) Applicant: HISENSE MOBILE COMMUNICATIONS TECHNOLOGY CO., LTD., Qingdao (CN)

(72) Inventors: Chuanqing Yang, Qingdao (CN); Zizhi Sun, Qingdao (CN); Bin Zheng, Qingdao (CN); Shidong Shang, Qingdao (CN); Changsheng Zhou, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 140 days.

This patent is subject to a terminal disclaimer.

(21) Appl. No.: 15/053,845

(22) Filed: Feb. 25, 2016

(65) Prior Publication Data
US 2017/0094717 A1    Mar. 30, 2017

(30) Foreign Application Priority Data

Sep. 30, 2015    (CN) .......................... 2015 1 0645048

(51) Int. Cl.
*H04W 88/04*    (2009.01)
*H04L 12/751*    (2013.01)

(52) U.S. Cl.
CPC ............. *H04W 88/04* (2013.01); *H04L 45/02* (2013.01)

(58) Field of Classification Search
CPC ............................... H04W 88/04; H04L 45/02
See application file for complete search history.

(56) References Cited

U.S. PATENT DOCUMENTS

| | | | | |
|---|---|---|---|---|
| 2014/0075189 A1* | 3/2014 | Abraham | ............... | H04W 76/04 713/168 |
| 2014/0334335 A1* | 11/2014 | Barathalwar | ......... | H04W 48/16 370/254 |
| 2015/0139203 A1* | 5/2015 | Miryala | ............ | H04W 28/0263 370/338 |

* cited by examiner

*Primary Examiner* — Yemane Mesfin
*Assistant Examiner* — Henry Baron
(74) *Attorney, Agent, or Firm* — Harness, Dickey & Pierce, P.L.C.

(57) ABSTRACT

The disclosure provides an apparatus and method for relaying by a mobile device and a storage medium, the apparatus including: one or more processors; and a memory, where: the memory stores therein one or more computer readable program codes configured to be executed by the one or more processors to perform operations of: connecting with a wireless access point through a station node of Wi-Fi; enabling a softAP node of Wi-Fi so that logon information of the mobile device is broadcasted, and one or more electronic devices are connected through the softAP node; enabling a packet forwarding function to enable a data packet to be forwarded between different nodes of Wi-Fi in the mobile device; and sending configuration information of packet forwarding to a Wi-Fi module so that a data packet is forwarded between the station node and the softAP node.

15 Claims, 3 Drawing Sheets

APPARATUS AND METHOD FOR RELAYING BY MOBILE DEVICE, AND STORAGE MEDIUM

CROSS-REFERENCE TO RELATED APPLICATION

This application claims the benefit and priority of Chinese Patent Application No. 201510645048.2 filed Sep. 30, 2015. The entire disclosure of the above application is incorporated herein by reference.

FIELD

The present disclosure relates to the field of mobile communications and particularly to an apparatus and method for relaying by a mobile device, and a storage medium.

BACKGROUND

This section provides background information related to the present disclosure which is not necessarily prior art.

Along with the improving level of our social life, wireless signals, e.g., Wireless Fidelity (Wi-Fi), have been widely applied to the various aspects of our life due to their convenience and expeditiousness.

However the strength and coverage area of the wireless signals in use have become significant factors affecting the experience of a user.

For example, if a router is placed in a sitting room, and a handset is placed in a bedroom, then there will be such a poor Wi-Fi signal that an access to the Internet may not be stable.

In another example, the searching handset locates a Wi-Fi signal outdoors, but the signal is so weak that an access indoors to the Internet may not be stable, and the signal can enable the access to the Internet only in a balcony or out of a window.

In a further example, if the user holding his or her handset is walking in a relatively large room, then a blind spot of the signal may frequently occur, thus interrupting the access to the Internet, etc.

SUMMARY

This section provides a general summary of the disclosure, and is not a comprehensive disclosure of its full scope or all of its features.

In order to address the problems above, an embodiment of the disclosure discloses a method for relaying by a mobile device, the method including:

connecting the mobile device with a wireless access point through a station node of Wi-Fi;

enabling a softAP node of Wi-Fi so that logon information of the mobile device is broadcasted, and one or more electronic devices are connected through the softAP node;

enabling a packet forwarding function to enable a data packet to be forwarded between the different nodes of Wi-Fi in the mobile device; and sending configuration information of packet forwarding to a Wi-Fi module so that a data packet is forwarded between the station node and the softAP node.

An embodiment of the disclosure further discloses an apparatus for relaying by a mobile device, applicable to the mobile device, the apparatus including:

one or more processors; and a memory, where:

the memory stores therein one or more computer readable program codes configured to be executed by the one or more processors to perform the operations of:

connecting with a wireless access point through a station node of Wi-Fi;

enabling a softAP node of Wi-Fi so that logon information of the mobile device is broadcasted, and one or more electronic devices are connected through the softAP node;

enabling a packet forwarding function to enable a data packet to be forwarded between the different nodes of Wi-Fi in the mobile device; and sending configuration information of packet forwarding to a Wi-Fi module so that a data packet is forwarded between the station node and the softAP node.

An embodiment of the disclosure further discloses a storage medium storing therein computer readable program codes configured to be executed by one or more processors to perform operations of:

connecting with a wireless access point through a station node of Wi-Fi;

enabling a softAP node of Wi-Fi so that logon information of the mobile device is broadcasted, and one or more electronic devices are connected through the softAP node;

enabling a packet forwarding function to enable a data packet to be forwarded between the different nodes of Wi-Fi in the mobile device; and sending configuration information of packet forwarding to a Wi-Fi module so that a data packet is forwarded between the station node and the softAP node.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In the embodiments of the disclosure, an AP is connected through a station node for communication, an electronic device is connected through a softAP node for communication, and data is forwarded between the station node and the softAP node, to thereby enable a relay function in a mobile device; and since the mobile device has been widely popularized, the existing mobile device can be reused as a relay to thereby avoid additional hardware from being configured, so as to greatly lower the cost, and also since no fixed power source receptacle is required to power the mobile device, the well-portable mobile device can be adjusted in position to the strength of a signal to thereby greatly enhance the relayed wireless signal.

Figure 1:
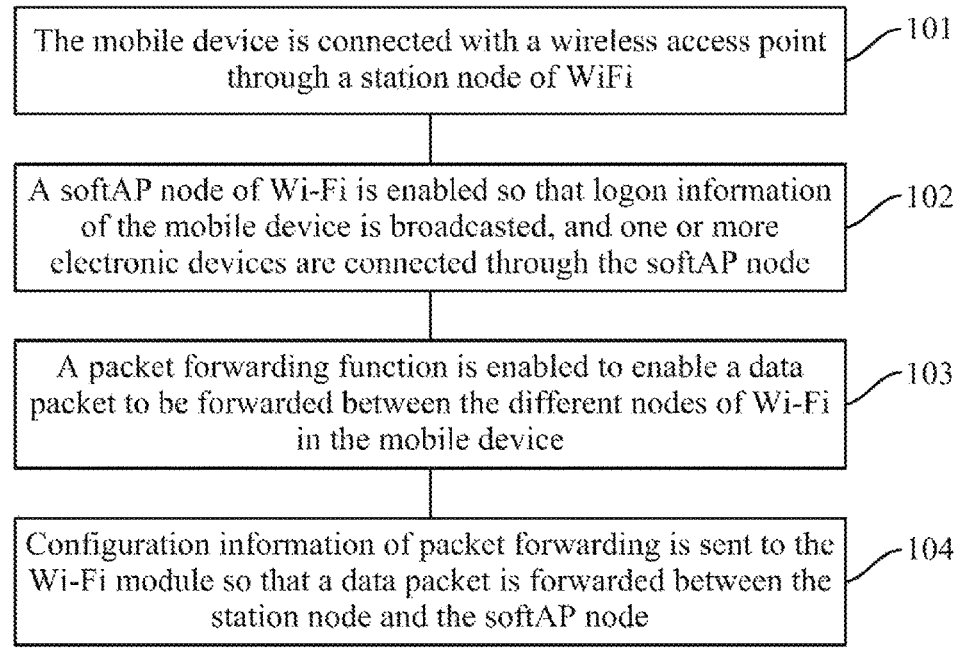
FIG. 1 is a flow chart of a method for relaying by a mobile device according to an embodiment of the disclosure.

Referring to FIG. 1, there is illustrated a flow chart of a method for relaying by a mobile device according to an embodiment of the disclosure, where the method can include the following operations:

Operation 101: the mobile device is connected with a wireless Access Point (AP) through a station node of WiFi.

It shall be noted that the embodiment of the disclosure can be applicable to an operating system of the mobile device, e.g., a handset, a tablet computer, a smart wearable device (e.g., a smart watch), etc.

These mobile devices generally support Windows Phone, Android, IOS, Windows, and other operating systems, and typically can be connected with a wireless access point, e.g., a router, through Wi-Fi.

Figure 2:
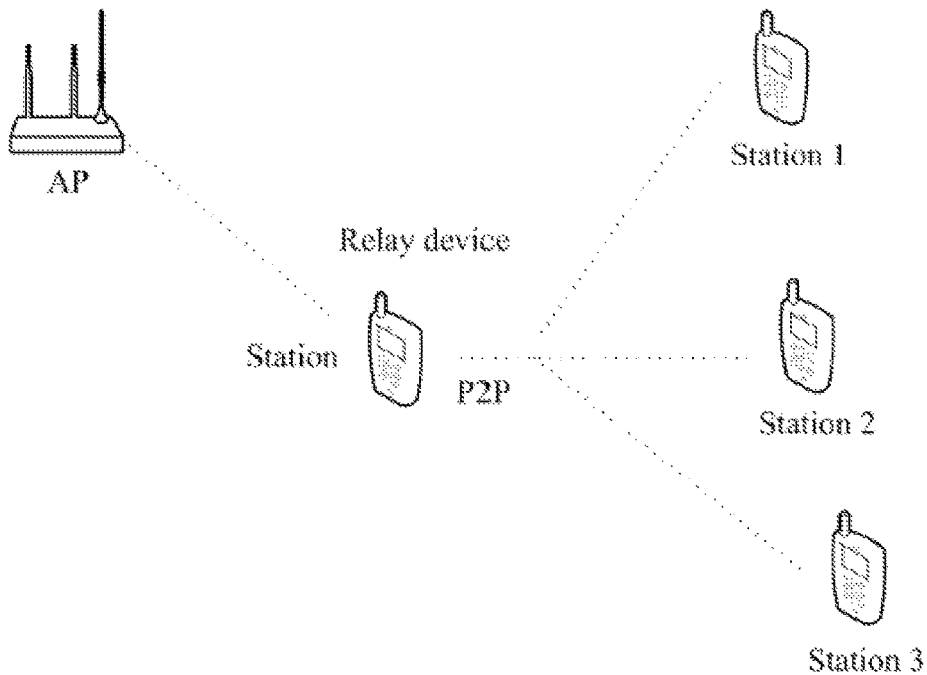
FIG. 2 is a schematic structural diagram of a topology of a relay system according to an embodiment of the disclosure.

As illustrated in FIG. 2, the AP is such a specific node in a wireless network that can access a base station, and through which another type of node in the wireless network can communicate with the outside or inside of the wireless network.

Wi-Fi of the mobile device typically configures the mobile device as a station or a softAP, or with P2P.

Particularly the station refers to such a device accessing the wireless network that can communicate with another device inside or outside the wireless network through a wireless access point.

The softAP refers to the mobile device functioning as a wireless access point so that the softAP-enabled mobile device can act as a router enabling an access of another station to the wireless network.

The P2P (Peer-to-Peer), also referred to as Wi-Fi Direct, can enable two Wi-Fi devices to be connected directly with and to communicate with each other without any wireless access point.

In the embodiment of the disclosure, the getWifiState( ) function in WifiManager can be invoked to determine whether the mobile device is enabled as a station node of Wi-Fi.

If a station node being enabled is detected, then the API interface getNetworkInfo( ) provided by ConnectivityManager can be invoked by inputting ConnectivityManager.TYPE_WIFI as a parameter thereto to determine whether the station node is connected with an AP.

If the returned NetworkInfo object is not Null, and isConnected( ) is true, then it will be determined that the station node is connected with an AP.

If it is determined that the station node is connected with the AP, then it will be determined that the mobile device is connected with the AP.

If it is determined that no station node is enabled or the station node is not connected with the AP, then an instruction will be generated that Connect to a Wireless Access Point, e.g., "Enable Wi-Fi and connect to a router".

Operation 102: a softAP node of Wi-Fi is enabled so that logon information of the mobile device is broadcasted, and one or more electronic devices are connected through the softAP node;

As illustrated in FIG. 2, if Wi-Fi is connected with an active AP, then a relay instruction will be sent to a Wi-Fi module to enable Wi-Fi relaying.

In an embodiment of the disclosure, the operation 102 can include the following sub-operations:

Sub-operation S11: a channel over which the wireless access point, to which the station node is connected, operates is detected;

Sub-operation S12: the logon information for logging into the mobile terminal is obtained, where the logon information includes a service set identifier and a password; and Sub-operation S13: the softAP node of Wi-Fi is enabled according to the channel, the service set identifier, and the password to broadcast the service set identifier over the channel.

If the station node of Wi-Fi is enabled and connected with an AP, then the channel of the AP to which the station is connected can be obtained, and the relay instruction can be sent over the channel of the AP to which the station node is connected, while the softAP is enabled. As for the channels, frequencies of the different channels are as follows:

Freq=2412 (Channel 1) Freq=2417 (Channel 2) Freq=2422 (Channel 3)
Freq=2427 (Channel 4) Freq=2432 (Channel 5) Freq=2437 (Channel 6)
Freq=2442 (Channel 7) Freq=2447 (Channel 8) Freq=2452 (Channel 9)
Freq=2457 (Channel 10) Freq=2462 (Channel 11) Freq=2467 (Channel 12)
Freq=2472 (Channel 13)

The relay function is performed generally in the case that the station and the softAP operate over the same channel because if they operate over different channels, then generally such a serious packet loss may occur that the relay function cannot be applied normally.

After the channel of the softAP is determined, the user is asked on a User Interface (UI) to enter a service set identifier (SSID) and a password of the relay device (i.e., the mobile device).

If the user enters the SSID and the password on the UI, then the SSID and the password will be used; otherwise, a default SSID and a default password will be used.

The freq, the SSID, and the password are written into a hostapd.conf configuration file, and the service of the softAP is enabled using the instruction of:

hostapd -d hostapd.conf

Thus the freq, the SSID, and the password can be validated.

After the relay instruction is sent, the relay device (i.e., the mobile device) sends a broadcast frame carrying the SSID, and another scanning electronic device locating the relay device can connect the relay device using the SSID and the password.

Operation 103: a packet forwarding function is enabled to enable a data packet to be forwarded between the different nodes of Wi-Fi in the mobile device.

Packet forwarding refers to forwarding a packet from one device to another device.

In a particular implementation, the packet forwarding function can be enabled using the echo attribute value.

echo 1>/proc/sys/net/ipv4/ip_forward

In the embodiment of the disclosure, the packet forwarding function is enabled to enable a data packet to be forwarded between the station node and the softAP node.

Operation 104: configuration information of packet forwarding is sent to the Wi-Fi module so that a data packet is forwarded between the station node and the softAP node.

The Wi-Fi module, also referred to as a serial interface Wi-Fi module, at the transport layer of the Internet of Things can be an embedded module, with inbuilt wireless network protocol IEEE 802.11b.g.n protocol stack, and a TCP/IP protocol stack, configured to convert a serial interface or TTL level in compliance with a Wi-Fi wireless network communication standard.

A hardware device in which the Wi-Fi module is embedded can access the Internet directly through Wi-Fi. Wi-Fi module is an important component to enable wireless intelligent home, Machine to Machine (M2M), and other Internet of Things applications.

In a real application, the address table service iptables of the system can be invoked to send a routing table to the Wi-Fi module, where the routing table includes a route between a first IP address of the softAP node, and a second IP address of the station node; and The address table service iptables of the system can be invoked to send configuration information of the Network Address Translation (NAT) function to the Wi-Fi module, where the source IP address and the destination IP address of the IP packet are modified automatically by the NAT function to translate the first IP address of the softAP node.

Of course, a prior routing table can be further removed before the routing table and the NAT function are sent.

The configuration information of iptables and NAT is as follows:

remove old rules (The prior routing table is removed)
iptables -F
iptables -t filter -F
iptables -t nat -F
Bring up NAT rules
iptables -t nat -A POSTROUTING -s 192.168.49.0/24 -d 0.0.0.0/0 -j MASQUERADE Here if the IP segment of the relay device (i.e., the mobile device) is 192.168.49.0, then "Bring up NAT rules" can be sent to re-encapsulate and de-encapsulate the data packet with the source address being the network segment of 192.168.49.0/24 by translating the source address into 0.0.0.0/0, and to forward the data packet to the station node.

In an embodiment of the disclosure, the method can further include the following operation:

Operation 105: configuration information of a Domain Name System (DNS) is sent to the Wi-Fi module so that a data packet received by the softAP node is forwarded.

The address table service iptables in the system can be invoked to send the address of a gateway of the DNS based on the Transport Control Protocol (TCP) to the Wi-Fi module in the command format of:

iptables -t nat -I PREROUTING -i (the name of the relay device) -p tcp --dport 53 -j DNAT --to-destination (the router gateway)

The address table service iptables in the system can be invoked to send the address of the gateway of the DNS based on User Datagram Protocol (UDP) of the open system interconnection protocol to the Wi-Fi module in the command format of:

iptables -t nat -I PREROUTING -i (the name of the relay device) -p udp --dport 53 -j DNAT --to-destination (the router gateway).

As described above, the DNS gateway addresses in the TCP and the UDP are added to the relay device (i.e., the mobile device), and after the DNS is configured, the input IP address will be parsed by the DNS server for communication over the network.

In the embodiments of the disclosure, the AP is connected through the station node for communication, the electronic device is connected through the softAP node for communication, and data is forwarded between the station node and the softAP node, to thereby enable the relay function in the mobile device; and since the mobile device has been widely popularized, the existing mobile device can be reused as a relay to thereby avoid additional hardware from being configured, so as to greatly lower the cost, and also since no fixed power source receptacle is required to power the mobile device, the well-portable mobile device can be adjusted in position to the strength of a signal to thereby greatly enhance the relayed wireless signal.

Figure 3:
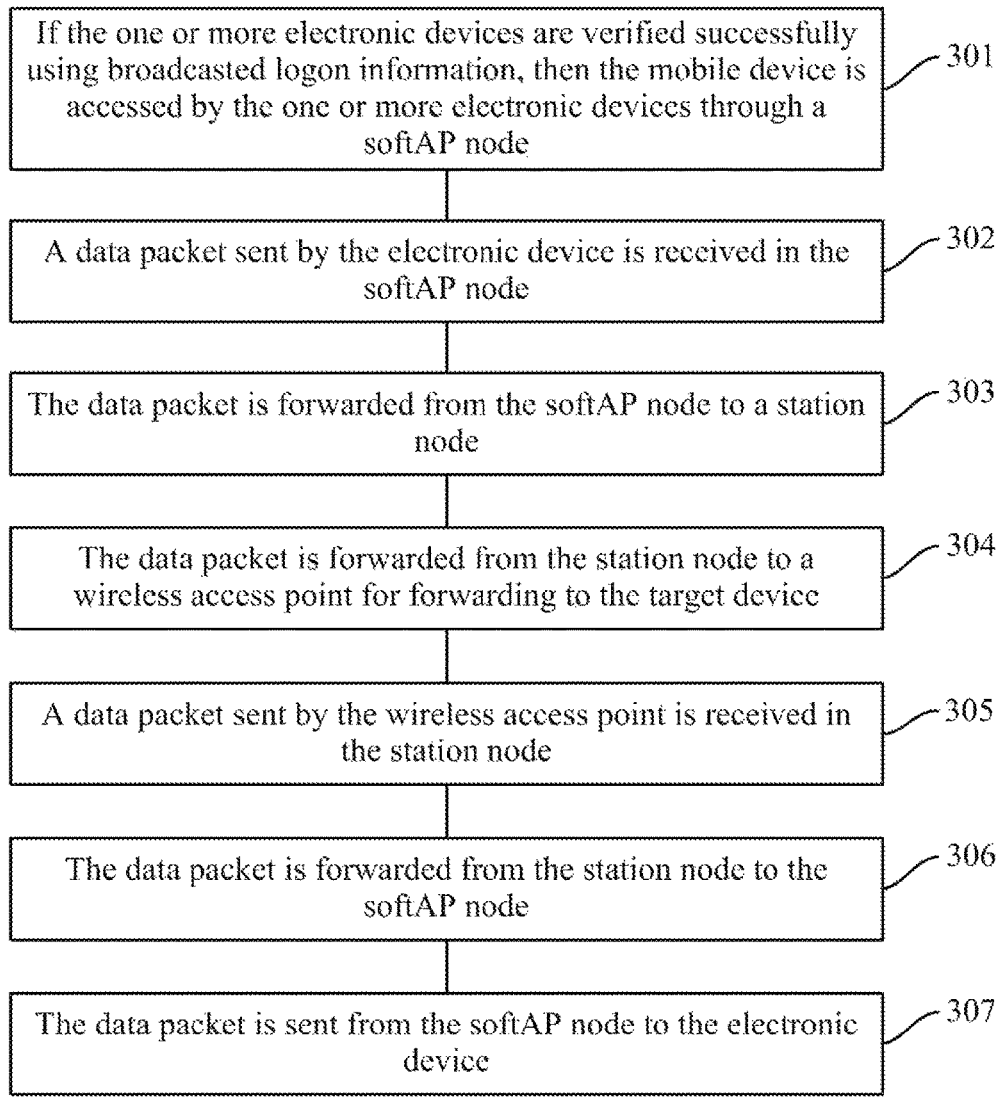
FIG. 3 is a flow chart of a method for relaying by a mobile device according to another embodiment of the disclosure.

Referring to FIG. 3, there is illustrated a flow chart of a method for relaying by a mobile device according to an embodiment of the disclosure, where the method can include the following operations:

Operation 301: if the one or more electronic devices are verified successfully using broadcasted logon information, then the mobile device is accessed by the one or more electronic devices through a softAP node;

The relay device (i.e., the mobile device) can be regarded as an AP to broadcast a beacon frame periodically so that another scanning station device locating the beacon frame can be provided with an SSID of the relay device (i.e., the mobile device).

If a request sent by the one or more electronic devices for a service set identifier in the logon information is received, then a response message of Challenge Text is returned to the one or more electronic devices;

If a connection request sent by the one or more electronic devices is received, then a password in the connection request is verified for consistency with a password in the logon information according to the password in the logon information; and If the passwords are consistent, then the one or more electronic devices access the mobile terminal, e.g., electronic devices of Station 1, Station 2, and Station 3 as illustrated in FIG. 2.

Operation 302: a data packet sent by the electronic device is received in the softAP node;

If the connected electronic device communicates with an external target device, then the electronic device will send the data packet to the relay device (i.e. the mobile device).

Operation 303: the data packet is forwarded from the softAP node to a station node;

In an implementation, it is determined whether a source address of the data packet is a first IP address of the softAP node, e.g., 192.168.49.0, and if so, then the first IP address is translated into a destination IP address of 0.0.0.0 based upon configuration information of NAT; and A routing table is searched for a second IP address corresponding to the first IP address, and since a packet forwarding function is enabled in advance, a data packet from the translated destination IP address can be forwarded to a station node at the second IP address.

Operation 304: the data packet is forwarded from the station node to a wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the softAP and the station operate over the same channel to thereby avoid a packet from being lost.

Operation 305: a data packet sent by the wireless access point is received in the station node.

If the external target device communicates with the electronic device connected therewith, then the target device will send the data packet to the relay device (i.e., the mobile device) through the base station.

Operation 306: the data packet is forwarded from the station node to the softAP node;

In an implementation, if a second IP address of the station node from which the data packet originates is determined, and the routing table is searched for a first IP address corresponding to the second IP address, then the data packet can be forwarded to the softAP node at the first IP address.

Operation 307: the data packet is sent from the softAP node to the electronic device.

The relay device sends the data packet of the external target device to the electronic device through the softAP node to thereby relay the data packet.

It shall be noted that the softAP node and the station node operate over the same channel to thereby avoid a packet from being lost.

It shall be noted that for the sake of a concise description, the embodiments of the method have been described as a series of actions in combination, but those skilled in the art shall appreciate that the embodiment of the disclosure will not be limited to the described order of the actions because some of the steps may be performed in another order or concurrently dependent upon the embodiments of the disclosure. Secondly those skilled in the art shall also appreciate that all the embodiments described here are preferred embodiments, but all the actions involved in the embodiments may not necessarily be necessary to the embodiments of the disclosure.

An embodiment of the disclosure further provides an apparatus for relaying by a mobile device, applicable to the mobile device, where the apparatus can include:

One or more processors; and

Figure 4:
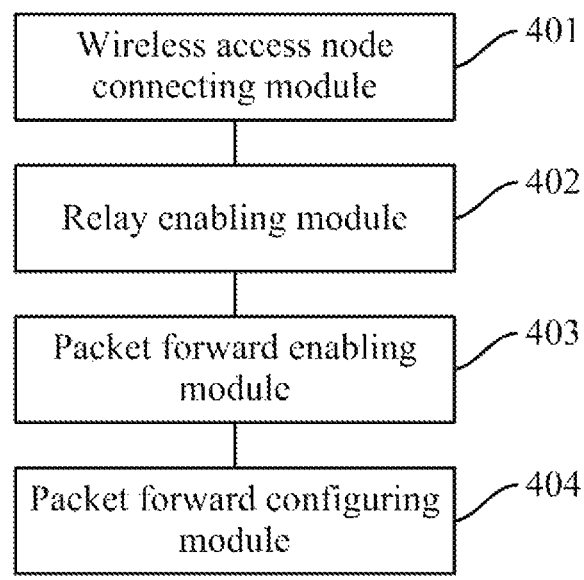
FIG. 4 is a schematic structural diagram of an apparatus for relaying by a mobile device according to an embodiment of the disclosure.

A memory, where:

The memory stores therein one or more computer readable program codes configured to be executed by the one or more processors to function as the following modules illustrated in FIG. 4:

A wireless access node connecting module 401 is configured to connect with a wireless access point through a station node of Wi-Fi;

A relay enabling module 402 is configured to enable a softAP node of Wi-Fi so that logon information of the mobile device is broadcasted, and one or more electronic devices are connected through the softAP node;

A packet forward enabling module 403 is configured to enable a packet forwarding function to enable a data packet to be forwarded between the different nodes of Wi-Fi in the mobile device; and A packet forward configuring module 404 is configured to send configuration information of packet forwarding to a Wi-Fi module so that a data packet is forwarded between the station node and the softAP node.

In an embodiment of the disclosure, the apparatus can further include the following module:

A DNS configuring module is configured to send configuration information of a Domain Name System (DNS) to the Wi-Fi module so that a data packet received by the softAP node is forwarded.

In an embodiment of the disclosure, the wireless access node connecting module 401 can include the following sub-modules:

An enabled Wi-Fi detecting sub-module is configured to determine whether the station node of Wi-Fi is enabled in the mobile device;

A connected wireless access point detecting sub-module is configured to determine whether the station node is connected with the wireless access point, when it is determined that the station node is enabled;

A connection determining sub-module is configured to determine that the mobile device is connected with the wireless access point, when it is determined that the station node is connected with the wireless access point; and An instruction generating sub-module is configured to generate an instruction to be connected with the wireless access point, when it is determined that the station node is not enabled or is not connected with the wireless access point.

In an embodiment of the disclosure, the relay enabling module 402 can include the following sub-modules:

A channel detecting sub-module is configured to detect a channel over which the wireless access point, to which the station node is connected, operates;

A logon information obtaining sub-module is configured to obtain the logon information for logging into the mobile terminal, where the logon information includes a service set identifier and a password; and A softAP enabling sub-module is configured to enable the softAP node of Wi-Fi according to the channel, the service set identifier, and the password to broadcast the service set identifier over the channel.

In an embodiment of the disclosure, the packet forward configuring module 404 can include the following sub-modules:

A routing table sending sub-module is configured to send a routing table to the Wi-Fi module, where the routing table includes a route between a first IP address of the softAP node, and a second IP address of the station node; and An NAT sending sub-module is configured to send configuration information of a Network Address Translation (NAT) function to the Wi-Fi module to translate the first IP address of the softAP node.

In an embodiment of the disclosure, the DNS configuring module can include the following sub-modules:

A TCP configuration sending sub-module is configured to send the address of a gateway of the Domain Name System (DNS) based on the Transport Control Protocol (TCP) to the Wi-Fi module; and A UDP configuration sending sub-module is configured to send the address of the gateway of the DNS based on the open system interconnection protocol UDP to the Wi-Fi module.

In an embodiment of the disclosure, the apparatus can further include the following module:

A device accessing module is configured, if the one or more electronic devices are verified successfully using the broadcasted logon information, to have the one or more electronic devices access the softAP node.

In an embodiment of the disclosure, the device accessing module can further include the following sub-modules:

A responding sub-module is configured, if a request sent by the one or more electronic devices for a service set identifier in the logon information is received, to return a response message to the one or more electronic devices;

A verifying sub-module is configured, if a connection request sent by the one or more electronic devices is received, to verify whether a password in the connection request is consistent with a password in the logon information according to the password in the logon information, and if so, an accessing sub-module is invoked; and An accessing sub-module is configured to have the one or more electronic device access.

In an embodiment of the disclosure, the apparatus can further include the following modules:

A first data packet receiving module is configured to receive in the softAP node a data packet sent by the electronic device;

A first data packet forwarding module is configured to forward the data packet from the softAP node to the station node; and A first data packet sending module is configured to send the data packet in the station node to the wireless access point for forwarding to a target device.

In an implementation, the data packet includes Uniform Resource Locator (URL) information, and the wireless access point maps the URL information to an IP address through a Domain Name System (DNS), and forwards the data packet to the target device at the IP address.

In an embodiment of the disclosure, the first data packet forwarding module can include the following sub-modules:

An IP address determining sub-module is configured to determine whether a source address of the data packet is a first IP address of the softAP node; and if so, to invoke a translating sub-module;

The translating sub-module is configured to translate the first IP address into a target IP address;

A first routing table searching sub-module is configured to search a routing table for a second IP address corresponding to the first IP address; and A first forwarding sub-module is configured to forward a data packet from the translated target IP address to the station node at the second IP address.

In an embodiment of the disclosure, the apparatus can further include the following modules:

A second data packet receiving module is configured to receive in the station node a data packet sent by the wireless access point;

A second data packet forwarding module is configured to forward the data packet from the station node to the softAP node; and A second data packet sending module is configured to send the data packet in the softAP node to the electronic device.

In an embodiment of the disclosure, the second data packet forwarding module can include the following sub-modules:

An IP address determining sub-module is configured to determine a second IP address of a station node from which the data packet originates;

A second routing table searching sub-module is configured to search a routing table for a first IP address corresponding to the second IP address; and A second forwarding sub-module is configured to forward the data packet to the softAP node at the first IP address.

An embodiment of the disclosure further provides a computer readable storage medium which can be a computer readable storage medium included in the memory according to the embodiment above, or which can be a separate computer readable storage medium which is not installed in the electronic device. The computer readable storage medium stores therein one or more programs configure to be executed by one or more processors to perform the methods according to the embodiments illustrated in FIG. 1 and FIG. 3, and for details of the methods, reference can be made to the embodiments in FIG. 1 and FIG. 3, and the relevant descriptions thereof, so a repeated description thereof will be omitted here.

Since the embodiments of the apparatus are substantially similar to the embodiments of the method, the embodiments of the apparatus have been described in brief, and reference can be made to the description of the embodiments of the method for details of the embodiments of the apparatus.

The respective embodiments in the description have been described progressively, and each of the embodiments has been focused on its differences from the other embodiments, and the description of their commonalities can be applied tp each other.

Those skilled in the art shall appreciate that the embodiments of the disclosure can be embodied as a method, an apparatus, or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Lastly it shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device, comprising:
one or more processors; and
a memory storing at least one instruction, the one or more processors configured to execute the at least one instruction to:
connect the mobile device to a wireless access point through a Wi-Fi station node of the mobile device;
enable a Wi-Fi softAP node of the mobile device to broadcast logon information of the mobile device, to allow one or more electronic devices to connect to the mobile device through the Wi-Fi softAP node;
enable a packet forwarding function to support forwarding of a data packet between the Wi-Fi station node and the Wi-Fi softAP node in the mobile device;
send a routing table for packet forwarding to a the Wi-Fi module of the mobile device such that the data packet is forwarded between the Wi-Fi station node and the Wi-Fi softAP node, the routing table comprising a route between a first IP address of the Wi-Fi softAP node and a second IP address of the Wi-Fi station node;
send an address of a gateway of a Domain Name System (DNS) to the Wi-Fi module to forward a data packet received by the Wi-Fi softAP node; and
after sending the routing table for packet forwarding to the Wi-Fi module, send configuration information of a Network Address Translation (NAT) function to the Wi-Fi module to translate the first IP address of the Wi-Fi softAP node.

2. The mobile device according to claim 1, wherein the one or more processors are further configured to execute the at least one instruction to:
have the one or more electronic devices access the Wi-Fi softAP node when the one or more electronic devices have successfully authenticated using the broadcasted logon information.

3. The mobile device according to claim 2, wherein the one or more processors are further configured to execute the at least one instruction to:
receive in the Wi-Fi softAP node a data packet sent from the one or more electronic devices;
forward the data packet from the Wi-Fi softAP node to the Wi-Fi station node; and
send the data packet from the Wi-Fi station node to the wireless access point to forward the data packet to a target device.

4. The mobile device according to claim 2, wherein the one or more processors are further configured to execute the at least one instruction to:
receive in the Wi-Fi station node a data packet sent from the wireless access point;
forward the data packet from the Wi-Fi station node to the Wi-Fi softAP node; and
send the data packet from the Wi-Fi softAP node to the one or more electronic devices.

5. A non-transitory storage medium, storing therein computer readable program codes configured to be executed by one or more processors to perform operations of:
connecting a mobile device to a wireless access point through a Wi-Fi station node of the mobile device;
enabling a Wi-Fi softAP node of the mobile device to broadcast logon information of the mobile device, to allow one or more electronic devices to connect to the mobile device through the Wi-Fi softAP node;
enabling a packet forwarding function to support forwarding of a data packet between the Wi-Fi station node and the Wi-Fi softAP node in the mobile device;
sending a routing table for packet forwarding to a Wi-Fi module of the mobile device such that the data packet is forwarded between the Wi-Fi station node and the Wi-Fi softAP node, the routing table comprising a route between a first IP address of the Wi-Fi softAP node and a second IP address of the Wi-Fi station node;
sending an address of a gateway of a Domain Name System (DNS) to the Wi-Fi module to forward a data packet received by the Wi-Fi softAP node; and
after sending the routing table for packet forwarding to the Wi-Fi module, sending configuration information of a Network Address Translation (NAT) function to the Wi-Fi module to translate the first IP address of the Wi-Fi softAP node.

6. A method for relaying by a mobile device, the method comprising:
connecting the mobile device to a wireless access point through a Wi-Fi station node of the mobile device;
enabling a Wi-Fi softAP node of the mobile device to broadcast logon information of the mobile device, to allow one or more electronic devices to connect to the mobile device through the Wi-Fi softAP node;
enabling a packet forwarding function to support forwarding of a data packet between the Wi-Fi station node and the Wi-Fi softAP node in the mobile device;
sending a routing table for packet forwarding to a Wi-Fi module of the mobile device such that the data packet is forwarded between the Wi-Fi station node and the Wi-Fi softAP node, the routing table comprising a route between a first IP address of the Wi-Fi softAP node and a second IP address of the Wi-Fi station node;
sending an address of a gateway of a Domain Name System (DNS) to the Wi-Fi module to forward a data packet received by the Wi-Fi softAP node; and
after sending the routing table for packet forwarding to the Wi-Fi module, sending configuration information of a Network Address Translation (NAT) function to the Wi-Fi module to translate the first IP address of the Wi-Fi softAP node.

7. The method according to claim 6, wherein enabling the Wi-Fi softAP node comprises:
detecting a channel over which the wireless access point, to which the Wi-Fi station node is connected, operates;
obtaining the logon information for logging into the mobile device, wherein the logon information comprises a service set identifier and a password; and
enabling the Wi-Fi softAP node according to the channel, the service set identifier, and the password to broadcast the service set identifier over the channel.

8. The method according to claim 6, wherein sending the address of the gateway of the DNS to the Wi-Fi module comprises:
sending the address of the gateway of the DNS based on a Transport Control Protocol (TCP) to the Wi-Fi module; or sending the address of the gateway of the DNS based on a User Datagram Protocol (UDP) of an open system interconnection protocol to the Wi-Fi module.

9. The method according to claim 6, further comprising:
having the one or more electronic devices access the Wi-Fi softAP node when the one or more electronic devices have successfully authenticated using the broadcasted logon information.

10. The method according to claim 9, wherein having the one or more electronic devices access the Wi-Fi softAP node when the one or more electronic devices have successfully authenticated using the broadcasted logon information comprises:
upon receiving a request with respect to a service set identifier in the logon information sent from the one or more electronic devices, returning a response message to the one or more electronic devices;
upon receiving a connection request from the one or more electronic devices, checking whether a password in the connection request is the same as a password in the logon information; and
in response to checking whether the password in the connection request is the same as the password in the logon information, having the one or more electronic devices access the Wi-Fi softAP node.

11. The method according to claim 9, further comprising:
receiving in the Wi-Fi softAP node a data packet sent from the one or more electronic devices;
forwarding the data packet from the Wi-Fi softAP node to the Wi-Fi station node; and
sending the data packet from the Wi-Fi station node to the wireless access point to forward the data packet to a target device.

12. The method according to claim 11, wherein the data packet comprises Uniform Resource Locator (URL) information which is mapped by the wireless access point to an IP address through a DNS, and is forwarded to the target device at the IP address.

13. The method according to claim 11, wherein forwarding the data packet from the Wi-Fi softAP node to the Wi-Fi station node comprises:
determining whether a source address of the data packet is the first IP address;
in response to determining that the source address of the data packet is the first IP address, translating the first IP address into a target IP address;
searching the routing table for the second IP address corresponding to the first IP address; and
forwarding the data packet from the translated target IP address to the Wi-Fi station node at the second IP address.

14. The method according to claim 9, further comprising:
receiving in the Wi-Fi station node a data packet sent from the wireless access point;
forwarding the data packet from the Wi-Fi station node to the Wi-Fi softAP node; and
sending the data packet from the Wi-Fi softAP node to the one or more electronic devices.

15. The method according to claim 14, wherein forwarding the data packet from the Wi-Fi station node to the Wi-Fi softAP node comprises:
determining the second IP address of the Wi-Fi station node from which the data packet originates;
searching the routing table for the first IP address corresponding to the second IP address; and
forwarding the data packet to the Wi-Fi softAP node at the first IP address.

* * * * *